INVENTORS
MARVIN A. JARVIS
MURRAY MARKS
BY Edward O. Ansell
William E. Hiller
ATTORNEYS

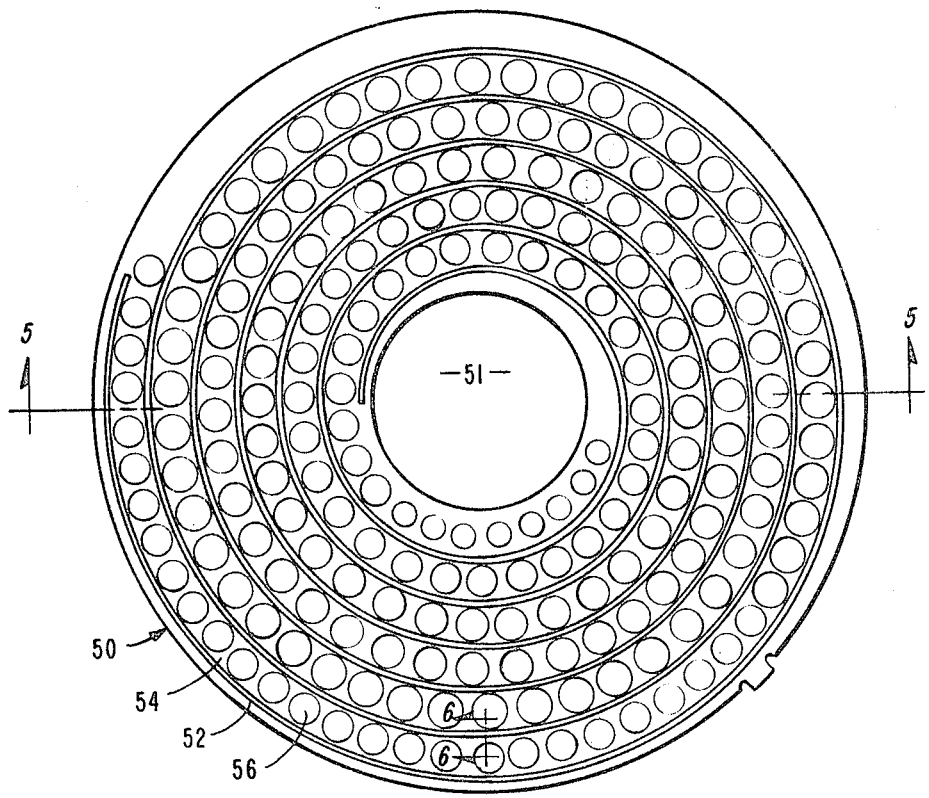
FIG.—4
FIG.—5
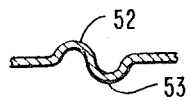
FIG.—6

*INVENTORS*
MARVIN A. JARVIS
MURRAY MARKS
BY Edward O. Ansell
William E. Hiller
ATTORNEYS

3,456,805
MEANS FOR CONTROLLING CONCENTRATION OF DISSOLVED SOLIDS ADJACENT TO REVERSE OSMOSIS MEMBRANE SURFACES IN DESALINATION DEVICE

Marvin A. Jarvis, Walnut, and Murray Marks, Los Angeles, Calif., assignors to Aerojet-General Corporation, El Monte, Calif., a corporation of Ohio
Filed Apr. 6, 1967, Ser. No. 628,935
Int. Cl. B01d 13/00
U.S. Cl. 210—321
8 Claims

ABSTRACT OF THE DISCLOSURE

The reverse osmosis desalination device of the invention provides means for compensating for loss in volume of liquid flow through successive groups of cells, thus permitting control of dissolved solids concentration adjacent to the membrane surfaces of the respective cells at a level promoting efficient membrane flux rate.

---

This invention relates to the desalination of saline water including brackish water and sea water having salts dissolved therein, and more particularly to means for controlling or regulating the concentration of such dissolved salts in the areas adjacent to reverse osmosis membrane surfaces in a desalination device comprising a plurality of desalination cells which are provided with reverse osmosis membranes capable of removing dissolved salts from saline water, wherein the separation of the product liquid from the saline water being processed through the desalination device is achieved with greater efficiency.

The utilization of saline water, such as sea water or brackish water, as a source from which fresh water can be obtained has long been considered as a possible solution to the problem of shortages in fresh water supplies. One technique by which dissolved salts can be removed from saline water to produce fresh water suitable for drinking and other potable uses involves the principle of reverse osmosis. Reverse osmosis requires the use of a semi-permeable membrane having particular permeability and surface properties so as to selectively transmit fresh water therethrough while rejecting dissolved salts in the saline water to which the membrane is exposed. The saline water is forced against the membrane under pressure with the permeability of the membrane being such that it passes fresh water therethrough at a much greater rate than the dissolved salts in the saline water. The fluid flow through the membrane is affected by the pressure applied to the saline water and upon the exposure of a membrane to saline water under a pressure higher than the osmotic pressure over a period of time, there is a tendency for a high salt concentration to accumulate in the region of the membrane which causes the efficiency of the membrane in passing fresh water therethrough to be reduced.

It has been recognized that the concentration of dissolved solids adjacent to the membrane surfaces in a desalination device comprising a plurality of desalination cells equipped with such membranes may be counteracted, at least to some extent, by inducing turbulence in the saline water being processed through the desalination device. One approach in holding down the accumulation of high salt concentrations in the areas adjacent the reverse osmosis membranes of the desalination device which is based solely on the induction of sufficient turbulence in the saline water being processed through the desalination device is disclosed in pending U.S. patent application, Ser. No. 577,907 filed Sept. 8, 1966, now abandoned. In the aforesaid pending U.S. application, a specially constructed baffle member is disposed between reverse osmosis membranes of adjacent cells, and by virtue of its construction, the baffle member induces a degree of turbulence in the saline water as it is directed between adjacent cells so as to combat high salt concentrations in the areas adjacent the reverse osmosis membranes of the cells.

In the present instance, it is an object of this invention to provide improved means for combatting the concentration of dissolved salts in areas adjacent the membrane surfaces of desalination cells in a desalination device, whereby such concentration of dissolved salts in the saline water being processed through the device is actually controlled or regulated in such a manner that the concentration of dissolved solids in the saline water adjacent to the membrane surfaces of respective cells can be held at a level promoting efficient membrane flux rates in passing desalinated liquid therethrough. By so controlling the concentration of dissolved solids in the saline water, the performance of the membranes of the respective cells in the desalination device is enhanced by increasing membrane flux rates (product flow) and decreasing permeation rates (dissolved solids passing through membranes). An accompanying benefit from this control of the concentration of dissolved solids adjacent to the membrane surfaces in a reverse osmosis desalination cell is that precipitation of solids on the membrane surfaces from the saline liquid having dissolved solids therein which are approaching the solubility limit is often prevented by maintaining a low level of boundary layer concentrations of such dissolved solids in the areas adjacent to the membrane surfaces.

It is another object of this invention to provide a device for desalinating saline liquid by reverse osmosis comprising a plurality of desalination cells arranged within a housing in stacked relationship with the cells being arranged in a plurality of cell groups with each successive group of cells containing a lesser number of cells than the preceding group in a predetermined retrogressive mathematical series as a means of controlling the boundary layer concentrations of dissolved salts in the areas adjacent to the membrane surfaces of the cells so as to hold such concentrations at low levels promoting efficient membrane flux rates in passing desalinated liquid therethrough.

It is another object of this invention to provide an improved desalination device comprising a plurality of reverse osmosis desalination cells arranged in stacked relationship within a housing, wherein boundary layer concentrations of dissolved solids adjacent to the membrane surfaces of the cells are controlled by employing baffle members between each set of adjacent cells which cooperate therewith to provide spiral paths along which liquid to be desalinated is directed as the liquid is processed through the housing, wherein the spiral path provided by each baffle member is of uniform width throughout the extent thereof on the respective baffle member, but with successive baffle members having spiral paths defined thereby of progressively decreasing width in a predetermined manner for achieving control of the concentration of dissolved solids adjacent to the membrane surfaces of the cells in the device so as to hold such concentrations of dissolved solids at a level promoting efficient membrane flux rates in passing desalinated liquid therethrough. In this instance, where the cells of the desalination device are arranged in plural groups with each of the cell groups comprising an equal number of cells, the spiral paths provided by the baffle members associated with each respective cell group would be of uniform width throughout the extents thereof, but the baffle members associated with each successive cell group would provide spiral paths of uniform width which is of progressively decreasing dimension as compared to the width of the spiral paths provided by the baffle members associated with the preceding cell group.

It is another object of this invention to provide an improved device for desalinating liquids by reverse osmosis comprising a plurality of reverse osmosis desalination cells disposed within a housing in stacked relationship, with baffle members disposed between each set of adjacent cells and defining therewith spiral paths along which liquid to be desalinated is directed as the liquid is processed through the housing, wherein the width of the spiral path provided by each of the baffle members progressively varies in size from one end of the spiral path to the other in a predetermined manner for achieving control of boundary layer concentrations of dissolved solids adjacent to the membrane surfaces of the cells so as to hold such concentrations of dissolved solids at a level promoting efficient membrane flux rates in passing desalinated liquid therethrough. In this instance, where the cells of the desalination device are arranged in plural groups with each of the cell groups comprising an equal number of cells, the spiral paths provided by the baffle members associated with each respective cell group would be identical as to the progressive variance in their widths, but the baffle members associated with each successive cell group would provide spiral paths with progressive width variance of a decreasing dimension range as compared to the dimension range of the progressive width variance of the spiral paths provided by the baffle members associated with the preceding cell group.

It is another object of this invention to provide an improved device for desalinating liquids by reverse osmosis comprising a plurality of reverse osmosis desalination cells disposed within a housing in stacked relationship, wherein each of the cells includes at least one reverse osmosis membrane with the cells being arranged in a plurality of cell groups such that each successive group of cells includes reverse osmosis membranes of varying permeability as a means of controlling the boundary layer concentrations of dissolved salts in the areas adjacent to the membrane surfaces of the cells so as to hold such concentrations at low levels promoting efficient membrane flux rates in passing desalinated liquid therethrough. In this embodiment, characteristically the membranes of the cells in the cell group nearest the inlet means for admitting liquid to be desalinated into the housing would be of a type having high membrane flux rates and high permeation rates and the membranes of the cells in successive cell groups would have decreasing flux rates and permeation rates such that the membranes of the cells in the cell group nearest the discharge outlet for removing waste liquid having concentrated dissolved solids therein from the housing would have low flux rates and low permeation rates so as to maintain a nearly constant solids content in the desalinated liquid obtained from the cells in each of the cell groups. In this instance, where each cell group comprises only a single cell, each successive membrane would be of varying permeability in the manner described, or the respective pairs of membranes included in each successive cell would be of varying permeability.

Some of the objects of the invention having been stated, other objects will become apparent as the description proceeds, when taken in connection with the accompanying drawings in which:

FIGURE 4 is an elevational view of a baffle member employed in the desalination cell assemblies of FIGURES 2 and 3;

FIGURE 5 is a transverse sectional view taken along the line 5—5 in FIGURE 4;

FIGURE 6 is a fragmentary enlarged transverse sectional view showing the radially offset contiguous relation between the oppositely projecting ribs of the baffle member of FIGURE 4;

Figure 1:
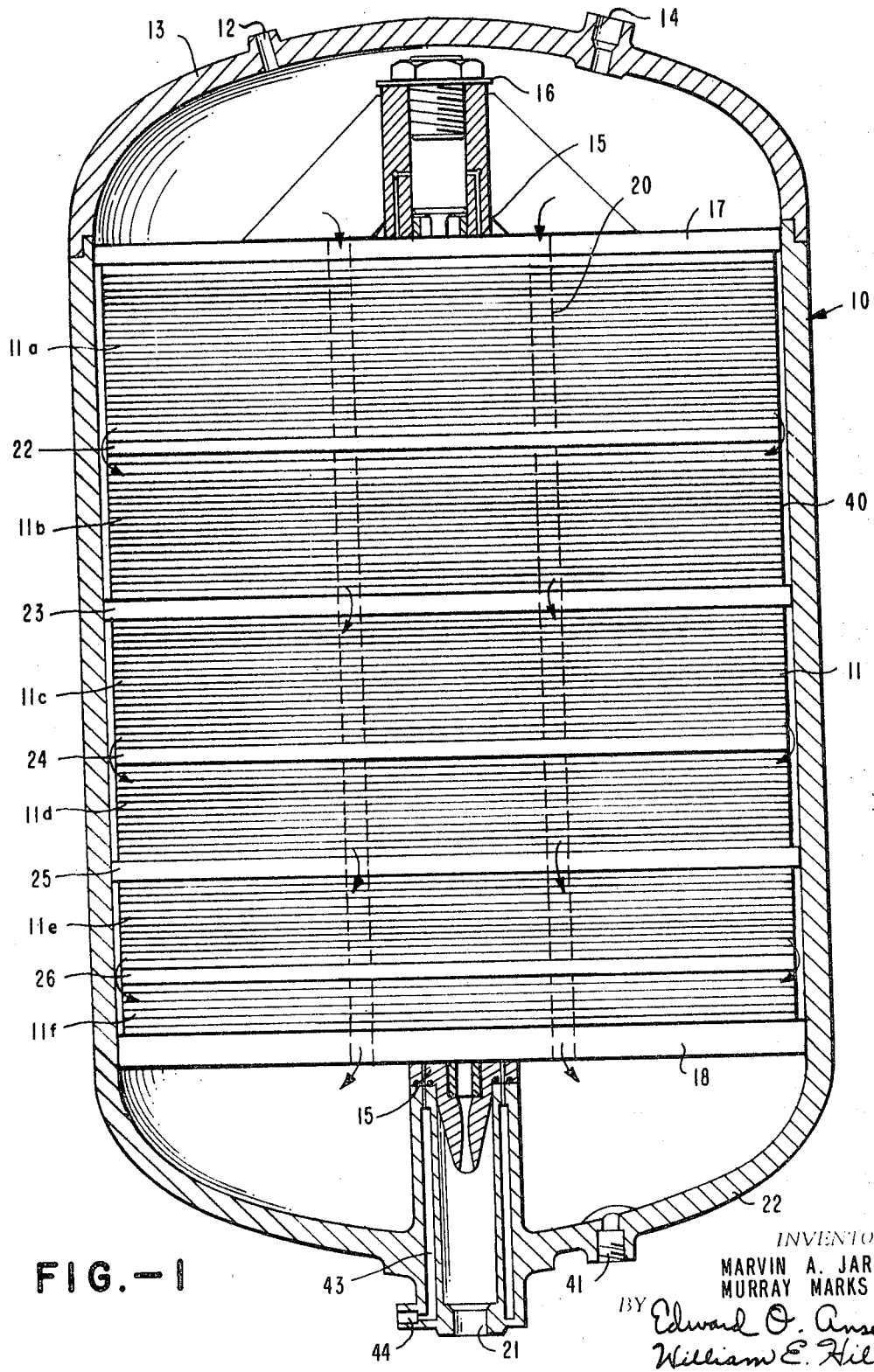
FIGURE 1 is a longitudinal sectional view of a desalination device constructed in accordance with the invention, showing a stacked assembly of desalination cells in elevation as mounted within the housing of the device.

Referring more specifically to the drawing, an improved desalination device as constructed in accordance with the present invention is illustrated in FIGURE 1, the desalination device being so constructed as to include means controlling the concentration of dissolved solids in the liquid being processed through the device so as to hold the concentration of dissolved solids in critical areas at levels promoting efficient desalination of the liquid. The concentration of dissolved solids in such critical areas is hereinafter referred to as the "boundary layer concentration." As shown, the desalination device comprises a generally cylindrical housing 10 in which a plurality of reverse osmosis desalination cells 11 are disposed in axially stacked relationship. The cells 11 are adapted to be exposed to saline water which may be introduced into the housing 10 from one end thereof through an inlet opening 12 provided in an end closure member 13 for the housing 10. The end closure member 13 is also provided with a suitable vent opening 14 so as to relieve excessive pressure should such a condition develop within the housing 10. A fresh water discharge conduit assembly is mounted within the housing 10, the fresh water discharge assembly including an outlet conduit 15 disposed centrally of the housing 10 and extending axially therein. The outlet conduit 15 is adapted to be communicatively connected to each of the cells 11 contained within the housing 10 for receiving desalinated liquid from these cells and subsequently discharging this desalinated liquid from the housing 10 as a product liquid. The forward end portion of the conduit 15 is received within the end closure member 13 of the housing 10 and is closed by a plug 16 threadably secured therein.

Figure 2:
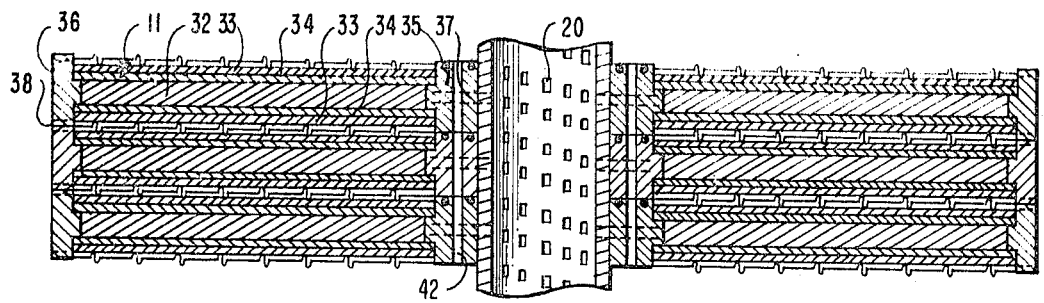
FIGURE 2 is a fragmentary longitudinal sectional view showing details of the desalination cell assembly of FIGURE 1.

A pair of internal end plates 17 and 18 are mounted within the housing 10 between which the plurality of desalination cells 11 are disposed in stacked clamped relationship. The internal end plates 17 and 18 are respectively provided with central openings therethrough for receiving the conduit 15. The conduit 15 is provided with a plurality of fluid-receiving orifices therethrough, as shown in FIGURE 2, these orifices taking the form of plural series of circumferentially spaced axially extending slots 20 which are adapted to be in communication with the respective cells 11 contained in the housing 10. Thus, it will be understood that desalinated liquid extracted by the individual cells 11 from the saline liquid being processed through the housing 10 will be transmitted from the cells 11 into the conduit 15 through the orifices 20, from where the desalinated liquid is subsequently withdrawn through a product liquid discharge outlet 21 provided in the rear end closure 22 of the housing 10 and communicatively connected to the conduit 15.

In order to promote proper passage of the saline liquid through the device, the desalination cells 11 are separated into two or more sections or groups, there being six such groups of cells 11a–11f illustrated in FIGURE 1. Between each group of cells, a partition plate is provided. Thus, partition plate 22 is disposed between groups 11a and 11b; partition plate 23 is disposed between groups 11b and 11c; partition plate 24 is disposed between groups 11c and 11d; partition plate 25 is disposed between groups 11d and 11e; and partition plate 26 is disposed between groups 11e and 11f. As will be observed, alternate partition plates 22, 24, and 26 are disposed in flush relationship with the outer peripheries of the cells 11 so as to be radially inwardly spaced from the housing 10. Conversely, alternate partition plates 23 and 25 extend radially outwardly with respect to the peripheries of the cells 11 into sealing engagement with the housing 10.

In the stacked cell assembly including the internal end plates 17 and 18, the plurality of desalination cells 11, and the partition plates 22, 23, 24, 25, and 26 interposed between successive groups of cells, a plurality of interrupted axially extending passages 30, as shown by the dashed lines in FIGURE 1, are provided therethrough so as to permit the liquid to be desalinated to be passed through the housing 10 in such a manner as to expose each of the plurality of cells 11 assembled in the successive groups 11a–11f thereto. In this respect, the alternate partition plates 22, 24, and 26 are solid so as to interrupt the plurality of axially extending passages 30 as between adjacent groups of cells respectively separated by the partition plates 22, 24, and 26, whereas the partition plates 23 and 25 are respectively provided with a plurality of apertures therethrough in registration with the axially extending passages 30 defined in the cells 11 so as to form respective continuations thereof.

Referring to FIGURE 2, it will be seen that each of the desalination cells 11 contained within the housing 10 of the desalination device of FIGURE 1 includes an intermediate support plate 32 which carries reverse osmosis membrane assemblies on its opposite side surfaces. Each of the reverse osmosis membrane assemblies on the opposite side surfaces of the support plate 32 is preferably of two-ply construction, including an outer layer comprising a membrane or film 33 of semi-permeable material capable of rejecting the dissolved salts in sea water or brackish water while permitting the passage of fresh water therethrough, such as a cellulose acetate film. Each reverse osmosis membrane assembly may further include an inner layer comprising a porous substrate sheet material in the form of a filter paper layer 34 backing up the reverse osmosis membrane 33 and adapted to be affixed to the respective opposite sides of the support plate 32.

The filter paper layer 34 enables the membrane 33 of cellulose acetate film to withstand the required pressure differential between the saline water and the fresh water on opposite sides of the membrane 33 which must be present in order to extract fresh water from the saline water through the membrane 33 by reverse osmosis. The physical characteristics of a cellulose acetate film comprising the reverse osmosis membrane 33 are such that, when subjected to pressure the cellulose acetate film is susceptible to perforation thereof by extrusion effects which may result in irreparable damage to the membrane and allow direct passage of saline water through the perforations formed therein. The filter paper back-up layer 34 has sufficient strength to enable the cellulose acetate film 33 to support the pressure differential required for reverse osmosis without the formation of perforations in the cellulose acetate film 33 and is sufficiently porous to allow passage of fresh water from the membrane 33 to the support plate 32 of the cell 11 without excessive pressure loss.

The support plate 32 of each cell 11 is a collector of desalinated liquid passed through the reverse osmosis membrane assemblies on each side thereof and is so constructed as to transmit the desalinated liquid to a product liquid discharge conduit for subsequent removal from the desalination device, in this instance, the centrally disposed conduit 15. The individual desalination cells 11 and the respective support plates 32 thereof may be similar to the type disclosed in copending U.S. patent application Ser. No. 554,773 filed June 2, 1966, now abandoned, wherein the cell includes an impervious frame component of suitable material, such as stainless steel, bounding the periphery of a reverse osmosis membrane sandwich including an intermediate support plate and membrane assemblies comprising an outer membrane and an inner filter paper layer on opposite sides thereof. Thus, the intermediate support plate 32 of the cell 11 may be made of sintered metallic material, such as sintered stainless steel, as is described in the aforesaid copending U.S. patent application, Ser. No. 554,773 filed June 2, 1966. It will be understood that the cell 11 may also be constructed in the manner disclosed in copending U.S. patent application Ser. No. 578,266, filed Sept. 9, 1966, now U.S. Patent No. 3,393,833, in which the support plate is provided with a plurality of internal circumferentially spaced radially extending channels which intersect respective laterally disposed slots formed in the opposite side surfaces thereof to define a network of fluid-conducting passageways therein for facilitating the transmission of desalinated liquid passed through the reverse osmosis membrane assemblies on opposite sides thereof to the product liquid discharge conduit 15.

However, as shown, each cell 11 includes an intermediate porous support plate 32 of sintered metal of the type disclosed in copending U.S. patent application Ser. No. 554,773, filed June 2, 1966 and further includes radially inner and radially outer annular frame members 35 and 36 respectively. The radially inner and radially outer frame members 35 and 36 of each cell 11 are made of impervious material, such as stainless steel, and are respectively disposed about the inner and outer peripheries of the membrane sandwich including the intermediate support plate 32 and the membrane assemblies on opposite sides thereof. The radially inner frame member 35 is provided with a plurality of radially extending ports 37 which respectively communicate with the porous support plate 32 and the product liquid discharge conduit 15 through the slots 20 formed therein so as to direct desalinated liquid collected in the support plate 32 to the product liquid discharge conduit 15, as will be presently described.

The radially outer frame member 36 of each cell 11 is provided with a plurality of radially extending notches on each end thereof which cooperate with corresponding notches formed in the radially outer frame member 36 of the cell 11 adjacent thereto to define radially extending passageways 38 which provide communication between the annular space formed between the proximal reverse osmosis membrane assemblies of adjacent cells 11 and an axially extending annular chamber 40 (FIGURE 1) defined between the housing 10 of the device and the radially inwardly spaced outer peripheries of the stacked cells 11.

In operation, saline liquid upon entering the housing 10 through the inlet opening 12 in the end closure member 13 is directed through the plurality of apertures formed in the internal end plate 17 in registration with the plurality of axially extending passages 30 formed in the cells of the forwardly disposed group of cells 11a. From the plurality of axially extending passages 30, the saline liquid flows radially outwardly into annular spaces between proximal reverse osmosis membrane assemblies of adjacent cells in the first group of cells 11a. Thus, the saline liquid is directed across the membranes of the cells 11 included in group 11a with desalinated liquid being passed through such membranes to their respective support plates for subsequent transmittal to the conduit 15 in the manner previously described. The saline liquid rejected by the membranes continues to flow radially outwardly, and subsequently flows past the outer peripheries of the cells in group 11a and past the outer periphery of the partition plate 22 so as to be directed radially inwardly with respect to the cells 11 included in group 11b for further desalination of the saline liquid by the membranes of such cells. Upon reaching the axially extending passages 30 defined by the aligned apertures in the cells of group 11b, the saline liquid is then directed through corresponding apertures defined in the partition plate 23 and into the plurality of axially extending passages 30 formed in the cells of group 11c. The saline liquid then flows radially outwardly between the cells of group 11c with the membranes extracting desalinated liquid therefrom, and the further flow of saline liquid through the housing 11 proceeds in a like manner, alternating between a radially inwardly directed flow and radially outwardly directed flow with respect to the cells in adjacent groups of cells, such as is shown in FIGURE 1 by the directional arrows. The saline liquid is subsequently discharged from the housing 10 as a saline concentrate liquid through a discharge outlet 41 provided in the rear end closure 22 of the housing 10. From the discharge outlet 41, the saline concentrate liquid may be directed to a suitable receptacle (not shown) where it is collected. This form of desalination device exhibits a flow pattern similar to that disclosed in copending U.S. patent application Ser. No. 578,266 filed Sept. 9, 1966.

The individual cells and partition plates are likewise provided with a plurality of aligned axial ports 42, such ports 42 being disposed in the annular radially inner frame members 35 of the individual cells 11. The axial ports 42 cooperate to define axially extending fluid leakage passageways which terminate at their rear ends in an annular leakage collection chamber 43. The annular leakage collection chamber 43 may be suitably formed in the rear end closure 22 of the housing 10 and may have a tap hole 44 associated therewith for removing leakage fluid by a suitable pump (not shown). In this connection, it will be understood that suitable seals are provided between partition plates and cells adjacent thereto to prevent commingling of the desalinated liquid being transmitted from the support plates 32 to the conduit 15 and the saline liquid being processed through the housing 10. Should any fluid leakage occur, such leakage fluid will be transmitted to the annular leakage collection chamber 43 through the axially extending leakage passageways defined by the aligned axial ports 42. This permits quick detection of a leaking condition which can be corrected by making suitable repairs. The leakage detection means as described above conforms generally to that disclosed in copending U.S. patent application Ser. No. 578,266 filed Sept. 9, 1966 to which reference is made for further structural details.

In accordance with the present invention, the desalination device of FIGURE 1 is provided with means for controlling the "boundary layer concentration" which is the concentration of dissolved salts in the saline liquid being processed through the housing 10 in areas adjacent to the membrane surfaces of the cells 11 in order that the concentration of dissolved salts adjacent to the membrane surfaces of respective cells 11 can be held at a level promoting efficient membrane flux rates in passing desalinated liquid therethrough for subsequent transmittal to the product discharge conduit 15. In the embodiment of the invention illustrated in FIGURE 1, this end is achieved by constructing the desalination device such that each successive group of cells contains a lesser number of cells 11 than the preceding group in a predetermined retrogressive mathematical series. In this connection, by way of example, it will be observed that the forwardly disposed group of cells 11a comprises twenty-three desalination cells 11, whereas the next successive group 11b comprises nineteen cells, and the successive groups 11c, 11d, 11e, and 11f respectively comprise eighteen, thirteen, twelve, and six cells in the desalination device illustrated in FIGURE 1.

By constructing the desalination device in the manner illustrated in FIGURE 1, the concentration of dissolved salts in the saline liquid being processed through the housing 10 may be controlled either by setting up a predetermined retrogressive mathematical series wherein each successive group of cells contains a lesser number of cells 11 than the preceding group with the number of cells 11 in each cell group being made proportional to the flow rate of the saline liquid through the housing 10. In this connection, it will be understood that the quantity of saline liquid passing through the housing 10 decreases with each successive cell group, since desalinated liquid has been extracted therefrom and transmitted to the product discharge conduit 15. Thus, the quantity of saline liquid being processed through the first cell group 11a will be decreased by the time that this saline liquid passes to the second cell group 11b, the quantity of saline liquid being progressively decreased with each successive cell group until it is discharged from the waste discharge outlet 41 provided in the rear end closure 22 of the housing 10. By setting up a predetermined retrogressive mathematical series as to the number of individual cells 11 in each cell group included in a desalination device, wherein the number of cells 11 in each cell group is made proportional to the flow rate of the saline liquid at various stages in its progress through the housing 10, a relatively constant velocity can be maintained for the flow of saline liquid. When this condition attains, the ratio of the boundary layer concentration of dissolved salts in areas adjacent to the membrane surfaces of respective cells 11 to the concentration of dissolved salts in the bulk saline liquid stream can be maintained essentially constant. Thus, by providing for such a velocity at a sufficiently high magnitude which would result in accompanying turbulence, the latter ratio can be maintained at a low figure. Any turbulence in the flow of the saline liquid through the stacked assembly of cells 11 would further aid in combatting the accumulation of high salt concentrations in the areas adjacent the membranes.

Another manner of employing the desalination device of FIGURE 1 in achieving control of the concentration of dissolved salts adjacent to the membrane surfaces of respective cells 11 is by setting up a predetermined retrogressive mathematical series as to the number of individual cells 11 in each cell group such that the flow velocity of the saline liquid will be increased in each successive cell group in a predetermined manner. When this condition is present, the boundary layer concentration of dissolved salts adjacent to the membrane surfaces of respective cells 11 can be maintained relatively constant throughout the assembly of stacked cells. As the flow velocity of the bulk stream of saline liquid is increased in each successive cell group, the ratio of the boundary layer concentration of dissolved salts adjacent to the membrane surfaces of respective cells 11 with respect to the concentration of dissolved salts in the bulk stream of saline liquid will decrease. This latter arrangement is particularly desirable where it may be necessary to hold pressure losses through a desalination device at a minimum level, while simultaneously controlling the boundary layer concentration of dissolved salts adjacent to the membrane surfaces of the cells 11 in order to avoid precipitation of such dissolved salts where the solubility limit of such salts is being approached.

Figure 3:
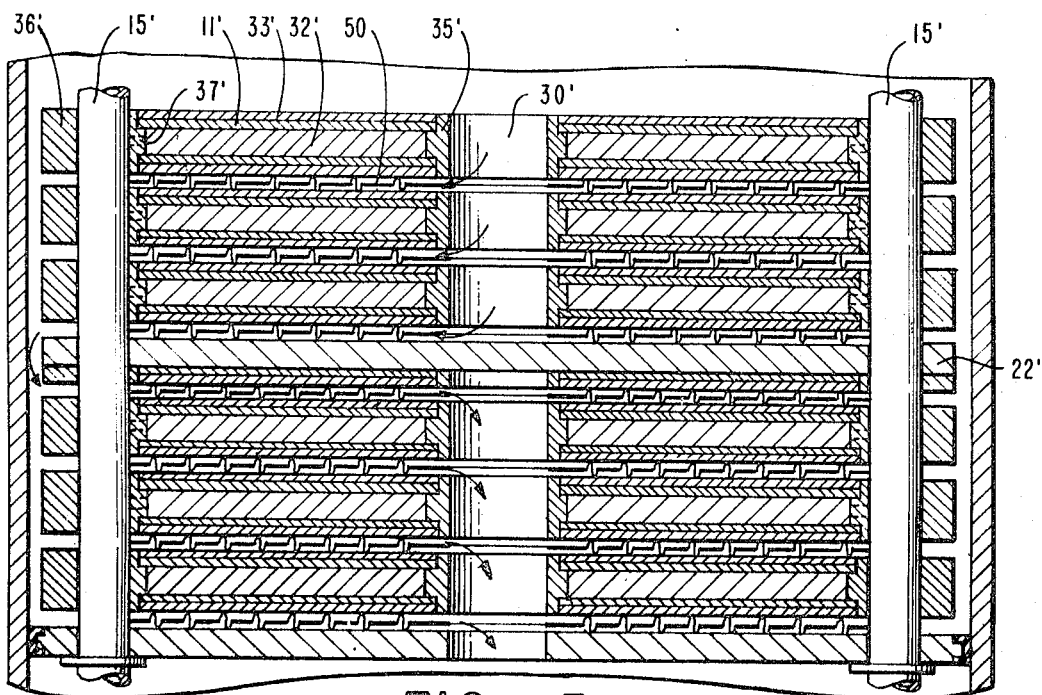
FIGURE 3 is a fragmentary longitudinal sectional view showing another embodiment of a desalination cell assembly.
Figure 7:
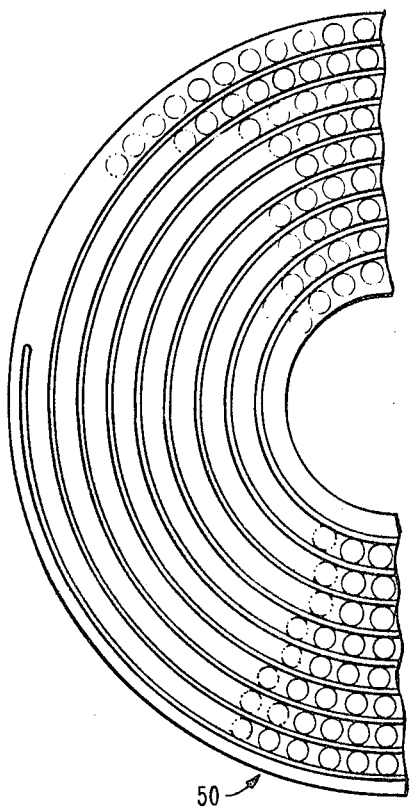
FIGURE 7 is a fragmentary elevational view of a baffle member in which the spiral path provided on the illustrated face thereof is of uniform width throughout its extent.

FIGURE 3 illustrates another embodiment of a desalination device in which the concentration of dissolved salts in the saline liquid being processed thereby is controlled in areas adjacent to the membrane surfaces of the cells of the device. To avoid repetitive description, structural elements or features appearing in FIGURE 3 which are functionally comparable to like structural elements or features shown in the embodiment of FIGURES 1 and 2 have been given the same reference numerals with the prime notation added. In the embodiment of FIGURE 3, the desalinated liquid extracted by the membranes 33' of respective cells 11' is collected by the support plates 32' and subsequently transmitted radially outwardly to a pair of product discharge conduits 15' diametrically disposed with respect to each other and extending through respective aligned apertures provided in the annular radially outer frame members 36' of the cells 11' and the respective partition plates separating adjacent groups of cells 11'. Thus, it will be understood that saline liquid to be desalinated enters the uppermost group of cells 11' in FIGURE 3 through the axially aligned openings 30' provided by the individual annular radially inner frame members 35' of the cells 11'. The liquid is then directed between adjacent cells in the upper cell group so as to flow radially outwardly between proximal reverse osmosis membrane assemblies of adjacent cells 11' in the upper cell group. Desalinated liquid from the saline liquid is then passed through such membranes 33' to their respective support plates 32' and subsequently transmitted radially outwardly through the radial ports 37' (shown by dashed lines) to either of the pair of conduits 15'. The saline liquid rejected by the membranes 33' in the upper cell group continues to flow radially outwardly, subsequently flowing past the outer peripheries of the cells 11' in the upper group and past the outer periphery of the partition plate 22' so as to be directed radially inwardly with respect to the cells 11' included in the lower group for further desalination of the saline liquid by the membranes 33' of such cells.

In the embodiment of FIGURE 3, it is contemplated that each group of cells will consist of an equal number of individual cells numbering from one cell per group upwardly. Controlling the boundary layer concentration of dissolved salts in the desalination device of FIGURE 3 is achieved by employing baffle members between each set of adjacent cells 11 in either of two particular structural arrangements as hereinafter described. The baffle members may be of the type disclosed in copending U.S. patent application, Ser. No. 577,907 filed Sept. 8, 1966. Thus, in FIGURE 4, a baffle member 50 is illustrated, the baffle member 50 being in the form of a plate comprising an annular wafer-like disc of flexible plastic material having a central circular aperture 51 therethrough and a circular outer periphery. The baffle plate 50 may be made of any suitable plastic material which is resistant to corrosion from the liquids to which the baffle plate 50 is to be exposed. A first spirally elongated rib or projection 52 extends outwardly of one side surface of the plate 50, one end of the elongate rib 52 being disposed at a point near the outer circular periphery of the plate 50 but spaced radially inwardly thereof and the other end of the rib 52 being disposed adjacent the inner periphery of the plate 50 bonding the central aperture 51 but spaced radially outwardly thereof. The rib 52 extends continuously in a spiral to form a plurality of spiral coils disposed in uniformly radially spaced relationship with respect to each other and arranged across a substantial portion of the surface area of the side of the plate 50.

On the opposite side surface of the plate 50, a second spirally elongated rib or projection 53 (FIGURE 5) is provided so as to project outwardly from the opposite side surface of the plate 50, the second spirally elongated rib 53 being arranged across the opposite side surface of the plate 50 in the same manner as the first spirally elongated rib 52. Referring to FIGURE 6, it will be observed that the second spirally elongated rib 53 is positioned in radially offset contiguous relation to the first spirally elongated rib 52 so as to cooperate therewith to define a substantially S-shaped cross section. The spirally elongated ribs 52, 53 respectively define labyrinthine back-to-back spiral paths on the opposite side surfaces of the baffle plate 50. As defined by the first and second spirally elongated ribs 52, 53, the respective labyrinthine spiral paths 54, 55 run spirally along the corresponding side of the baffle plate 50.

The baffle plate 50 is further provided with fluid turbulence-generating means in the form of a plurality of apertures 56 through which fluid flow may occur so as to cause repeated dividing and re-combining of the fluid flow stream being controlled by the baffle plate 50 as more fully disclosed in the aforesaid copending U.S. patent application Ser. No. 577,907, filed Feb. 8, 1966. Instead of the diminishing number of cells in each successive group of cells as shown in the desalination device of FIGURE 1, the number of cells in each cell group in the desalination device of FIGURE 3 is the same, but the width of the back-to-back labyrinthine spiral paths 54, 55 provided by the baffle plates 50 associated with each group of cells 11' varies as between the successive groups of cells. Thus, the back-to-back labyrinthine spiral paths 54, 55 provided by the baffle plates 50 associated with the cells 11' in the upper group 11a' are of uniform width throughout the extent thereof, but the baffle plates 50 associated with the cells 11' of the lower group 11b' have labyrinthine spiral paths 54, 55 defined thereby of uniform width which is, however, decreased in size with respect to the uniform width exhibited by the labyrinthine spiral paths 54, 55 provided by the baffle plates 50 included with the cells 11' of group 11a'. It will be understood that the baffle plates 50 associated with the cells in successive cell groups likewise provide back-to-back labyrinthine spiral paths of a uniform width in each cell group which is of progressively decreasing size with respect to the width of such spiral paths provided by the baffle plates associated with preceding cell groups. In this embodiment of the invention, it will be understood that each cell group may comprise only a single desalination cell 11' in which case each successive baffle plate 50 in the desalination device would define back-to-back labyrinthine spiral paths of uniform width, but of lesser width than the immediately preceding baffle plate 50.

Figure 9:
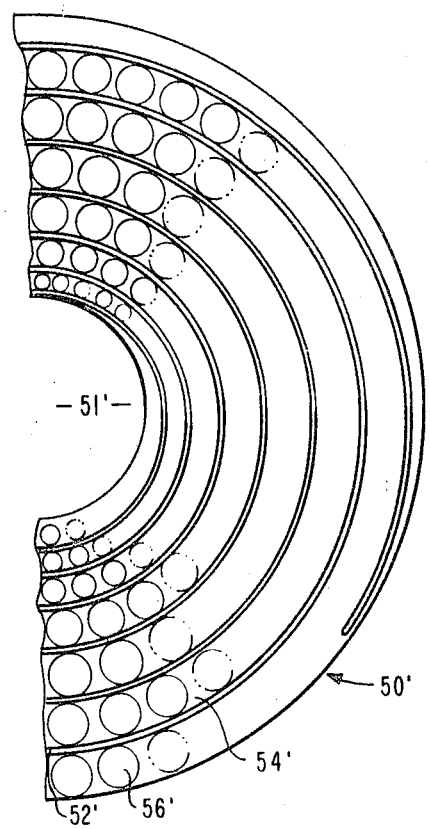
FIGURE 9 is a fragmentary elevational view of a modified baffle member in accordance with the present invention, wherein the width of the spiral path provided on the illustrated face thereof progressively varies in size from one end of the spiral path to the other.
Figure 10:
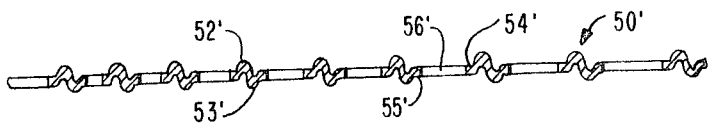
FIGURE 10 is an enlarged transverse sectional view taken through the modified baffle member of FIGURE 9.
Figure 8:
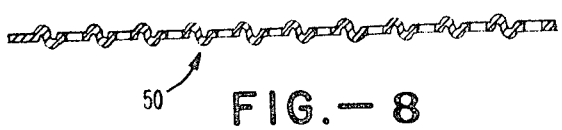
FIGURE 8 is an enlarged transverse sectional view through the baffle member of FIGURE 7.

A modified baffle plate 50' is shown in FIGURES 9 and 10 in which the labyrinthine back-to-back spiral paths 54', 55' respectively defined by the spirally elongated ribs 52', 53' are not of uniform width, but instead have widths progressively varying in size from one end of spiral paths 54', 55' to the other in a predetermined manner. In this instance the spiral paths 54', 55' provided by the baffle plates 50' associated with each respective cell group are identical as to the progressive variance in their widths, but the baffle plates 50' associated with each successive cell group provide spiral paths 54', 55' with progressive width variance of a decreasing dimension range as compared to the dimension range of the progressive width variance of the spiral paths 54', 55' provided by the baffle plates 50' associated with the preceding cell group.

Thus, when the baffle plates 50' are employed in the desalination device of FIGURE 3, for example, the progressive width variances of the spiral paths 54', 55' provided by the baffle plates 50' associated with the cells 11' in the upper cell group 11a' are identical, while the baffle plates 50' are associated with the cells 11' of the lower group 11b' have spiral paths 54', 55' with identical progressive width variances but of decreasing dimension range as compared to the dimension range of the progressive width variance of the spiral paths 54', 55' provided by the baffle plates 50' associated with the cells 11' of the upper cell group 11a'. Since the flow of saline liquid is radially outwardly with respect to the cells 11' in group 11a' and radially inwardly with respect to the cells 11' in group 11b', it will be understood that there will be a corresponding reversal in the progressive width variance of the spiral paths 54', 55' provided by the baffle plates 50' such that the widest width of the spiral paths provided by the baffle plates associated with cell group 11a' will be found adjacent the inner peripheries thereof while the widest width of the spiral paths provided by the baffle plates associated with cell group 11b' will be found adjacent the outer peripheries thereof. Where each cell group comprises only a single cell 11', the range dimension of the progressive width variance for the spiral paths 54′, 55′ provided by successive baffle plates 50′ progressively decreases such that this range dimension of the progressive width variance for the spiral paths 54′, 55′ provided by one baffle plate 50′ is smaller than the corresponding range dinmension of the immediately preceding baffle plate 50′.

While the embodiments of the invention employing baffle members have been described with respect to particular forms of baffle plates of the type disclosed in copending U.S. patent application, Ser. No. 577,907, filed Sept. 8, 1966, it will be understood that such baffle plates are exemplary only and that any suitable baffle members respectively providing at least one spiral path for directing fluid flow therealong can be used in keeping with the spirit of the invention. Such baffle members may also be employed in the desalination device of FIGURES 1–2, if desired, either with or without the fluid flow regulation features discussed herein, as is shown in FIGURE 2. In the same connection, the physical construction of the desalination devices of FIGURES 1–2 and FIGURE 3 are to be considered as representative examples with which the present invention providing for control of boundary layer concentration of dissolved solids in areas adjacent membrance surfaces may be employed. Thus, the form of the invention shown with the desalination device of FIGURES 1–2 can be employed with the desalination device of FIGURE 3 and vice versa.

For operating conditions where there is a large difference in the concentration of dissolved solids in the feed stream of saline liquid admitted into the desalination device as compared to the concentration of dissolved solids in the saline concentrate liquid eventually discharged from the desalination device as waste liquid, this invention contemplates employing reverse osmosis membranes having differing flux rates and permeation rates as components of the desalination cells as a means of controlling the boundary layer concentrations of dissolved solids in the areas adjacent to the membrane surfaces. It is possible to produce membrane material with significant variations in flux rates (product flow) and permeation rates (dissolved solids passing through membranes). By providing the desalination cells in the cell group nearest the inlet in the desalination housing for admitting liquid to be desalinated thereinto with membranes having a high flux rate and a high permeation rate, and the cells in successive groups with membranes having decreasing flux rates and permeation rates such that the membranes of the cells in the cell group nearest the discharge outlet for removing waste liquid from the housing have the lowest flux rate and the lowest permeation rate, effective boundary layer concentration control can be maintained. In this instance, a substantially constant solids content can be maintained in the desalinated liquid obtained from the cells in each of the cell groups. This particular embodiment of the invention may prevent precipitation of solids on the membrane surfaces of cells located near the waste liquid discharge outlet where the solubility limit of such dissolved solids is likely to be closely approached.

It will be understood that this latter embodiment of the invention may be employed alone or in combination with either or both of the embodiments (decreasing number of cells per successive cell groups as shown in FIGURES 1–2, and the baffle member control as shown in FIGURES 3–10) as a means of controlling the boundary layer concentrations of dissolved solids adjacent to the membrane surfaces of the cells in a desalination device so as to hold such concentrations at low levels promoting efficient membrane flux rates in passing desalinated liquid therethrough.

While this invention has been described with reference to specific illustrated embodiments thereof, it will be understood that numerous modifications might be resorted to without departing from the scope of the invention as defined in the following claims.

We claim:
1. A device for desalinating liquids by reverse osmosis comprising:
  a housing,
  a plurality of reverse osmosis desalination cells disposed within said housing in stacked relationship,
  each of said cells comprising at least one reverse osmosis membrane, and means supporting said membrane, and collecting desalinated liquid passed therethrough;
  inlet means for admitting liquid to be desalinated into said housing so as to expose the liquid to the plurality of desalination cells disposed within said housing,
  said cells being arranged in plural groups such that each group comprises at least one cell,
  a partition plate positioned between adjacent groups of cells,
  each successive group of cells containing a lesser number of cells than the preceding group in a predetermined retrogressive mathematical series such that the concentration of dissolved solids in the liquid being processed through said housing is controlled adjacent to the membrane surfaces of said cells, whereby the concentration of dissolved solids adjacent to the membrane surfaces of respective cells can be held at a level promoting efficient membrane flux rates in passing desalinated liquid therethrough,
  outlet means communicatively connected to each of said cells for receiving desalinated liquid passed through said membranes and through which the desalinated liquid is discharged from said housing, and
  discharge means for removing liquid having concentrated dissolved solids therein which is rejected by said membranes from said housing.

2. A device for desalinating liquids by reverse osmosis comprising:
  a housing,
  a plurality of reverse osmosis desalination cells disposed within said housing in stacked relationship,
  each of said cells comprising at least one reverse osmosis membrane, and means supporting said membrane and collecting desalinated liquid passed therethrough;
  inlet means for admitting liquid to be desalinated into said housing so as to expose the liquid to the plurality of desalination cells disposed within said housing,
  a baffle member disposed between each set of adjacent cells and in engagement therewith, each of said baffle members cooperating with the respective cells between which it is disposed to provide at least one spiral path along which liquid to be desalinated is directed as the liquid is processed through said housing,
  the spiral path provided by each baffle member being of uniform width throughout the extent thereof on the respective baffle member,
  the uniform width of the spiral path provided by successive baffle members progressively decreasing in size in a predetermined manner such that the concentration of dissolved solids in the liquid being processed through said housing is controlled adjacent to the membrane surfaces of said cells, whereby the concentration of dissolved solids adjacent to the membrane surfaces of respective cells can be held at a level promoting efficient membrane flux rates in passing desalinated liquid therethrough,
  outlet means communicatively connected to each of said cells for receiving desalinated liquid passed through said membranes and through which the desalinated liquid is discharged from said housing, and
  discharge means for removing liquid having concentrated dissolved solids therein which is rejected by said membranes from said housing.

3. A device for desalinating liquids by reverse osmosis comprising:

a housing, a plurality of reverse osmosis desalination cells disposed within said housing in stacked relationship, each of said cells comprising at least one reverse osmosis membrane, and means supporting said membrane and collecting desalinated liquid passed therethrough;

inlet means for admitting liquid to be desalinated into said housing so as to expose the liquid to the plurality of desalination cells disposed within said housing, a baffle member disposed between each set of adjacent cells and in engagement therewith, each of said baffle members cooperating with the respective cells between which it is disposed to provide at least one spiral path along which liquid to be desalinated is directed as the liquid is processed through said housing, the width of the spiral path provided by each of said baffle members progressively varying in size from one end of the spiral path to the other in a predetermined manner with the dimension range of the progressive width variance of the spiral paths provided by successive baffle members progressively decreasing in a predetermined manner such that the concentration of dissolved solids in the liquid being processed through said housing is controlled adjacent to the membrane surfaces of said cells, whereby the concentration of dissolved solids adjacent to the membrane surfaces of respective cells can be held at a level promoting efficient membrane flux rates in passing desalinated liquid therethrough, outlet means communicatively connected to each of said cells for receiving desalinated liquid passed through said membranes and through which the desalinated liquid is discharged from said housing, and discharge means for removing liquid having concentrated dissolved solids therein which is rejected by said membranes from said housing.

4. A device for desalinating liquids by reverse osmosis comprising:

a housing, a plurality of reverse osmosis desalination cells disposed within said housing in stacked relationship, each of said cells comprising at least one reverse osmosis membrane, and means supporting said membrane and collecting desalinated liquid passed therethrough;

inlet means for admitting liquid to be desalinated into said housing so as to expose the liquid to the plurality of desalination cells disposed within said housing, the membrane of each successive cell having a progressively decreasing flux rate and permeation rate such that the concentration of dissolved solids in the liquid being processed through said housing is controlled adjacent to the membrane surfaces of said cells, whereby the concentration of dissolved solids adjacent to the membrane surfaces of respective cells can be held at a level promoting efficient membrane flux rates in passing desalinated liquid therethrough, outlet means communicatively connected to each of said cells for receiving desalinated liquid passed through said membranes and through which the desalinated liquid is discharged from said housing, and discharge means for removing liquid having concentrated dissolved solids therein which is rejected by said membranes from said housing.

5. A device for desalinating liquids by reverse osmosis comprising:

a housing, a plurality of reverse osmosis desalination cells disposed within said housing in stacked relationship, each of said cells comprising at least one reverse osmosis membrane, and means supporting said membrane and collecting desalinated liquid passed therethrough;

inlet means for admitting liquid to be desalinated into said housing so as to expose the liquid to the plurality of desalination cells disposed within said housing, said cells being arranged in plural groups such that each group comprises at least one cell, means regulating the flow of liquid to be desalinated between successive groups of cells so as to control the concentration of dissolved solids in the liquid being processed through said housing adjacent to the membrane surfaces of said cells including means for compensating for the loss in volume of such liquid between successive groups of cells caused by the collection of desalinated liquid by the respective cells in each group of cells, whereby the concentration of dissolved solids adjacent to the membrane surfaces of respective cells can be held at a minimum level promoting efficient membrane flux rates in passing desalinated liquid therethrough, outlet means communicatively connected to each of said cells for receiving desalinated liquid passed through said membranes and through which the desalinated liquid is discharged from said housing, and discharge means for removing liquid having concentrated dissolved solids therein which is rejected by said membranes from said housing.

6. A device for desalinating liquids by reverse osmosis comprising:

a housing, a plurality of reverse osmosis desalination cells disposed within said housing in stacked relationship;

each of said cells comprising at least one reverse osmosis membrane, and means supporting said membrane and collecting desalinated liquid passed therethrough;

inlet mean for admitting liquid to be desalinated into said housing so as to expose the liquid to the plurality of desalination cells disposed within said housing;

said cells being arranged in plural groups such that each group comprises at least one cell;

means for controlling the concentration of dissolved solids in the liquid being processed through said housing adjacent to the membrane surfaces of said cells so that the concentration of dissolved solids adjacent to the membrane surfaces of respective cells can be held at a level promoting efficient membrane flux rates in passing desalinated liquid therethrough, said means for controlling the concentration of dissolved solids comprising a plurality of baffle members associated with each of said plural groups of cells and being respectively disposed between each set of adjacent cells and in engagement therewith, each of said baffle members cooperating with the respective cells between which it is disposed to provide at least one spiral path along which liquid to be desalinated is directed as the liquid is processed through said housing, the spiral path provided by each baffle member being of uniform width throughout the extent thereof on the respective baffle member, the uniform width of the spiral path provided by each of the baffle members associated with the same group of cells being equal, and the uniform width of the spiral paths provided by the baffle members of successive groups of cells progressively decreasing in size in a predetermined manner such that the concentration of dissolved solids in the liquid being processed adjacent to the membrane surfaces of respective cells is controlled;

outlet means communicatively connected to each of said cells for receiving desalinated liquid passed through said membranes and through which the desalinated liquid is discharged from said housing; and discharge means for removing liquid having concentrated dissolved solids therein which is rejected by said membranes from said housing.

7. A device for desalinating liquids by reverse osmosis comprising:

a housing;

a plurality of reverse osmosis desalination cells disposed within said housing in stacked relationship;

each of said cells comprising at least one reverse osmosis membrane, and means supporting said membrane and collecting desalinated liquid passed therethrough;

inlet means for admitting liquid to be desalinated into said housing so as to expose the liquid to the plurality of desalination cells disposed within said housing;

said cells being arranged in plural groups such that each group comprises at least one cell;

means for controlling the concentration of dissolved solids in the liquid being processed through said housing adjacent to the membrane surfaces of said cells so that the concentration of dissolved solids adjacent to the membrane surfaces of respective cells can be held at a level promoting efficient membrane flux rates in passing desalinated liquid therethrough, said means for controlling the concentration of dissolved solids comprising a plurality of baffle members associated with each of said plural groups of cells and being respectively disposed between each set of adjacent cells and in engagement therewith, each of said baffle members cooperating with the respective cells between which it is disposed to provide at least one spiral path along which liquid to be desalinated is directed as the liquid is processed through said housing the width of the spiral path provided by each of said baffle members progressively varying in size from one end of the spiral path to the other in a predetermined manner, the spiral paths with the progressively varying widths provided by each of the baffle members associated with the same group of cells being identical, and the dimension range of the spiral paths with the progressively varying widths provided by the baffle members of successive groups of cells progressively decreasing in a predetermined manner such that the concentration of dissolved solids in the liquid being processed adjacent to the membrane surface of respective cells is controlled;

outlet means communicatively connected to each of said cells for receiving desalinated liquid passed through said membranes and through which the desalinated liquid is discharged from said housing; and discharge means for removing liquid having concentrated dissolved solids therein which is rejected by said membranes from said housing.

8. A device for desalinating liquids by reverse osmosis comprising:

a housing;

a plurality of reverse osmosis desalination cells disposed within said housing in stacked relationship;

each of said cells comprising at least one reverse osmosis membrane, and means supporting said membrane and collecting desalinated liquid passed therethrough;

inlet means for admitting liquid to be desalinated into said housing so as to expose the liquid to the plurality of desalination cells disposed within said housing;

said cells being arranged in plural groups such that each group comprises at least one cell;

means for controlling the concentration of dissolved solids in the liquid being processed through said housing adjacent to the membrane surfaces of said cells so that the concentration of dissolved solids adjacent to the membrane surfaces of respective cells can be held at a level promoting efficient membrane flux rates in passing desalinated liquid therethrough;

outlet means communicatively connected to each of said cells for receiving desalinated liquid passed through said membranes and through which the desalinated liquid is discharged from said housing;

discharge means for removing liquid having concentrated dissolved solids therein which is rejected by said membranes from said housing;

the membranes of each of the cells in the same group of cells have the same flux rate and permeation rate for passing desalinated liquid therethrough; and the flux rate and permeation rate of the membranes of the cells in successive groups of cells progressively decreasing in a predetermined manner so as to comprise the said means for controlling the concentration of dissolved solids in the liquid being processed through said housing.

References Cited

UNITED STATES PATENTS

| 3,357,565 | 12/1967 | Burger | 210—321 |
| 3,362,540 | 1/1968 | Bluemle | 210—321 |

OTHER REFERENCES

U.S. Dept. of Interior Office of Saline Water R&D Progress Report No. 86, by Aerojet-General Corp., received in Patent Office April 10, 1964, page 3 relied on.

Keilin et al.: Design Criteria for Reverse Osmosis Desalination Plants, presented at the First International Symposium on Water Desalination, Oct. 3–9, 1965, 17 pp. Pages 12–17 relied on.

REUBEN FRIEDMAN, Primary Examiner

F. A. SPEAR, JR., Assistant Examiner